United States Patent [19]

Watanabe

[11] Patent Number: 4,516,665
[45] Date of Patent: May 14, 1985

[54] ELEVATOR CONTROL SYSTEM

[75] Inventor: Eiki Watanabe, Inazawa, Japan

[73] Assignee: Mitsubishi Denki Kabushiki Kaisha, Tokyo, Japan

[21] Appl. No.: 607,113

[22] Filed: May 1, 1984

[30] Foreign Application Priority Data

May 10, 1983 [JP] Japan .................. 58-81409

[51] Int. Cl.³ .............................................. B66B 5/00
[52] U.S. Cl. ..................................... 187/29 R; 307/64
[58] Field of Search ...................... 187/29; 307/64, 70, 307/75; 318/415, 438, 803; 363/34, 37, 38

[56] References Cited

U.S. PATENT DOCUMENTS

| | | | |
|---|---|---|---|
| 4,316,097 | 2/1982 | Reynolds | 187/29 X |
| 4,376,471 | 3/1983 | Uchino et al. | 187/29 |
| 4,456,097 | 6/1984 | Salihi | 187/29 |

FOREIGN PATENT DOCUMENTS 132275 10/1981 Japan .

Primary Examiner—William M. Shoop
Assistant Examiner—W. E. Duncanson, Jr.
Attorney, Agent, or Firm—Wenderoth, Lind & Ponack

[57] ABSTRACT

An elevator control system has a converter for converting an AC power from a normal power source to a DC power having a variable voltage, an inverter for inverting the DC power from the converter to an AC power having a variable voltage and a variable frequency, and an induction motor energized by the inverter to drive an electric motor. When a power failure occurs on the normal power source as sensed by a power failure sensor, the converter is connected to an emergency power source to be fully fired to generate a DC power higher in DC voltage than that due to the normal power source.

12 Claims, 9 Drawing Figures

ELEVATOR CONTROL SYSTEM

BACKGROUND OF THE INVENTION

This invention relates to an elevator control system, and more particularly to such a system for driving an induction motor for an elevator car by an emergency electric generator.

Recently, the development in control technologies are so remarkable that induction motors can be controlled as precisely as DC motors by a variable voltage, variable frequency control system. The variable voltage, variable frequency control system comprises a converter for converting an AC power to a DC power, and an inverter for inverting the DC power to an AC power having a variable voltage and a variable frequency, the last-mentioned AC power being supplied to an induction motor to drive it. Such a control system may use a pulse amplitude modulation (which is abbreviated hereinafter to a "PAM") control and/or a pulse width modulation (which is abbreviated hereinafter to a "PWM") control. The PAM control varies a DC voltage which corresponds to the peak value of the output voltage from the inverter and the PWM control regulates the mean value of the output voltage by rendering a time width thereof variable with the peak value thereof fixed.

In the elevator control system, the induction motor should be controlled over a wide speed-range from a null to the full speed thereof. When the converter delivers the full voltage during a low speed operation of the induction motor, the induction motor increases in both noise and heat generation. In order to suppress the noise and heat generation, it may be preferable to jointly use the PAM and PWM controls and to decrease DC voltage from the inverter by PAM control during the low speed operation.

There is known an elevator control system comprising the variable voltage, variable frequency control as described above selectively energized by a normal and an emergency power source to drive an induction motor for an elevator car. As described above, the DC voltage is controlled to a low magnitude when an elevator car is operated at low speeds during the acceleration and deceleration thereof. This results in a low power factor of the power source. The normal power source is generally large in capacity and therefore does not depend upon a variation in power factor thereof. The emergency power source, however, is relatively small in capacity. This means that a low power factor results in an increase in voltage drop. In order to compensate for this voltage drop, it is required to increase the capacity of the emergency power source resulting in the disadvantage that the emergency power source becomes expensive.

Accordingly it is an object of the present invention to provide a new and improved elevator control system capable of driving an elevator car by an emergency electric source small in capacity.

SUMMARY OF THE INVENTION

The present invention provides an elevator control system comprising a normal power source for generating an AC power, a converter for converting the AC power to a DC power having a variable voltage, an inverter for inverting the DC power with the variable voltage to an AC power having a variable voltage and a variable frequency, and an induction motor for an elevator car driven and controlled by the inverter wherein there are provided a power failure sensor for sensing the occurrence of a power failure on the normal power source to generate a power failure indicating signal; an emergency power source for generating an AC power during a power failure occurring the normal power source; a changeover switch disposed between the normal and emergency power sources and the converter to change the connection of the converter so that a power supply to the converter is effected by either one of the normal and emergency power source, the change-over switch performing the change-over operation in response to the power failure indicating signal from the power failure sensor so that, when the normal power source is normally operated, the normal power source supplies an electric power to the converter, and that, when a power failure occurs on the normal power source, the emergency power source supplies an electric power to the converter; and a control unit for applying a control signal to the converter to deliver a DC power having the variable voltage therefrom, the control unit being responsive to the power failure indicating signal from the power failure sensor to supply a control signal to the converter so as to cause the converter to generate a DC voltage higher than that generated by the converter when the latter receives the power supply from the normal power source.

In a preferred embodiment of the present invention the control unit is responsive to the normal operation of the normal power source as determined by the power failure sensor to control a voltage of the DC power generated by the converter to be variable, and responsive to the power failure indicating signal from the power failure sensor to control the converter to be fully fired.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1A:
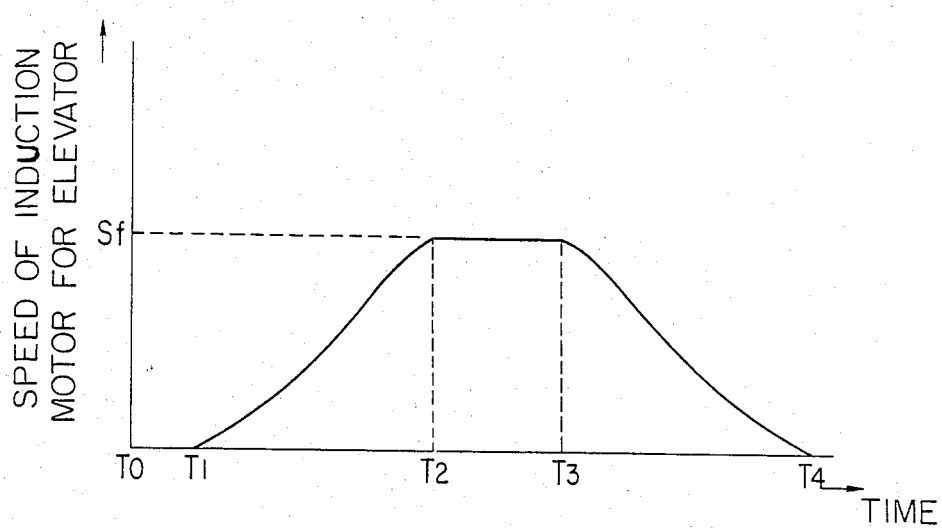
FIGS. 1A and 1B are waveforms useful in explaining a PAM control for an elevator car.
Figure 1B:
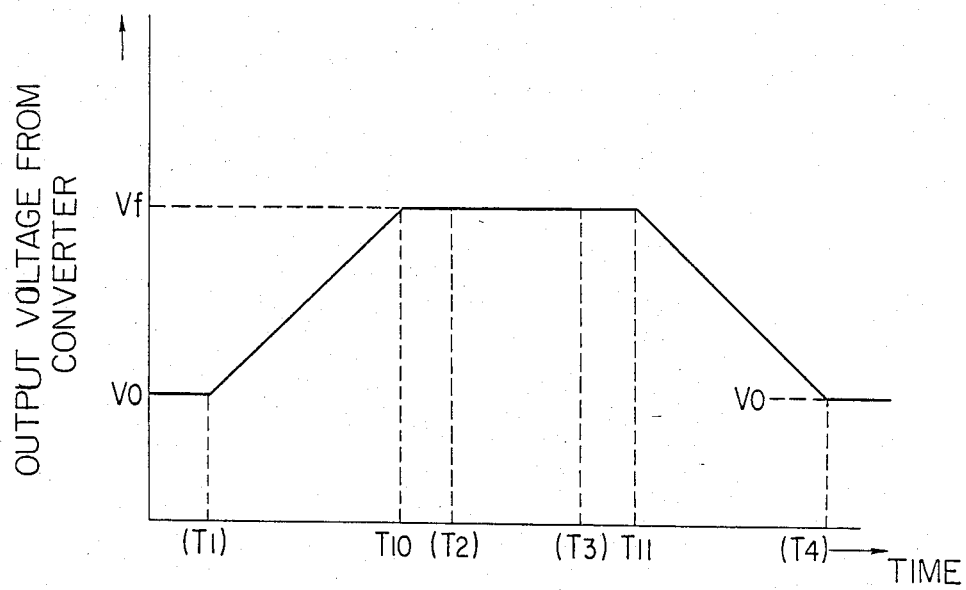

For a better understanding of the nature of the present invention, the description will now be made in conjunction with the PAM and PWM controls utilized by a variable voltage, variable frequency control system in which a converter converts an AC power to a DC power which is, in turn, inverted to an AC power with a variable voltage and a variable frequency by an inverter. The AC power thus inverted is supplied to an induction motor to drive an associated elevator car. In the PAM control the induction motor for the elevator car has a speed as shown in FIG. 1A of the drawings wherein the axis of ordinates represents the speed and, the axis of abscissas represents time, while the converter delivers an output voltage as plotted in ordinate against time in abscissa in FIG. 1B. During a time interval ($T_1-T_0$) the induction motor is stopped as shown in FIG. 1A and the converter delivers an output volgage at a low magnitude of $V_o$ as shown in FIG. 1B. Then the induction motor is initiated to be accelerated at a time point $T_1$ and reaches a full speed $S_f$ at a time point $T_2$ as shown in FIG. 1A while the output voltage from the converter is initiated to increase from the low magnitude at the time point $T_1$ and reaches a full magnitude $V_f$ at a time point $T_{10}$ before the time point $T_2$ as shown in FIG. 1B. Then the induction motor is driven at the full speed $S_f$ during a time interval ($T_3-T_2$) and then decelerated to a null speed at a time point $T_4$ as shown in FIG. 1A.

On the other hand, the converter continues to be fully fired to deliver an output voltage at the constant magnitude $V_f$ during a time interval ($T_{11}-T_0$) and then the output voltage decreases to the low magnitude $V_o$ at the time point $T_4$ as shown in FIG. 1B. During the stoppage of the induction motor, the output voltage from the converter is maintained at the low magnitude $V_o$.

It is noted that the output voltage from the converter is initiated to decrease at the time point $T_{11}$ later than the time point $T_3$ when the induction motor is initiated to decelerate.

From the foregoing it is seen that the PAM control controls the output voltage from the converter which is the peak value of the output voltage from the variable voltage variable frequency control system along with the speed of the induction motor.

Figure 2A:
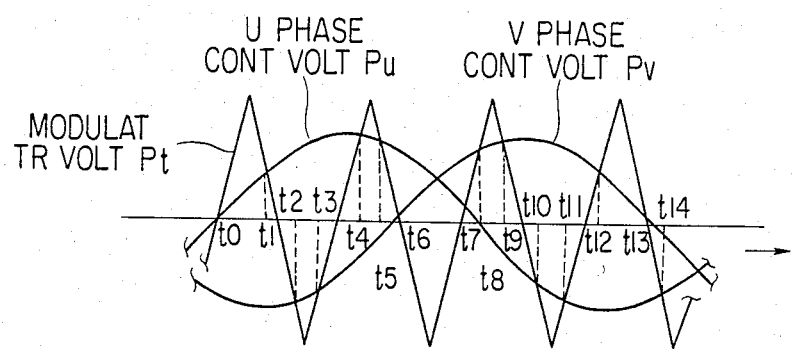
FIGS. 2A, 2B, 2C and 2D are waveforms useful in explaining a PWM control for an elevator car.

Subsequently, the PWM control will be described in conjunction with FIG. 2. First a modulating triangular voltage $P_t$ as shown in FIG. 2A is compared with a U, a V and a W phase control voltage of a three phase system. FIG. 2A shows the U and V phase control voltages $P_u$ and $P_v$ respectively but the W phase control voltage $P_w$ is not illustrated only for purposes of illustration. The three phase control voltages are identical in waveform to one another but shifted in phase from one another. Then the inverter is turn on and off in accordance with the results of the comparisions.

Figure 2B:
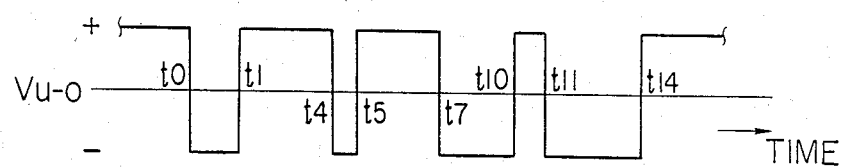

As shown in FIG. 2B, a voltage $V_{u-o}$ across an imaginary neutral point o (not shown) and a U-shape output terminal of the inverter is at its negative level during a time interval ($t_1-T_0$), as shown in FIG. 2A and at its positive level during a time interval ($t_4-t_1$) as shown in FIG. 2A. Then each time the U-phase control voltage $P_u$ is less than the modulating triangular voltage $P_t$, the voltage $V_{u-o}$ becomes negative while each time the U-phase control voltage $P_u$ is higher than the modulating triangular voltage $P_t$, the voltage $V_{u-o}$ becomes positive as shown in FIG. 2B.

Figure 2C:
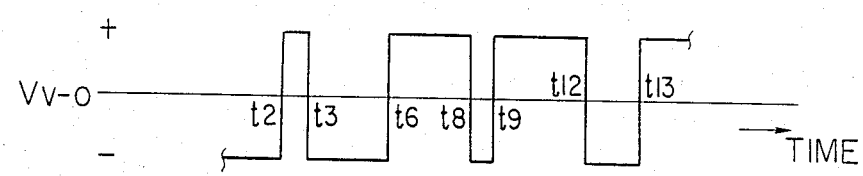

This is true in the case of the V and W phase control voltage $P_v$ and $P_w$ respectively. For example, a voltage $V_{v-o}$ across the ideal neutral point o and a V phase output terminal of the inverter has a waveform as shown in FIG. 2C. A waveform of a similar voltage $V_w$ for the W phase can readily be understood from the illustration of FIGS. 2B and 2C.

Figure 2D:
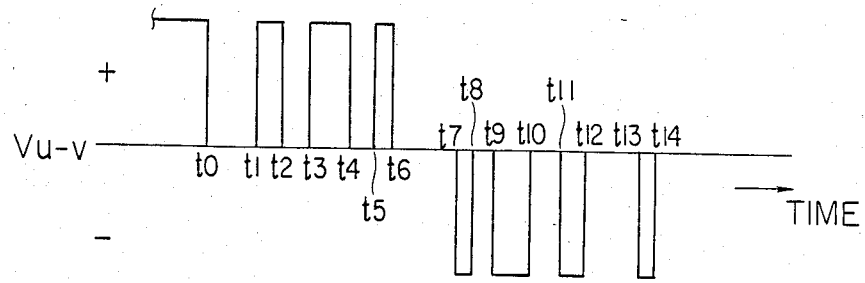

A line voltage $V_{u-v}$ between the U and V phases is given by a difference between the voltage $V_{u-o}$ and the voltage $V_{v-o}$ and therefore has a waveform as shown in FIG. 2D. The remaining line voltages $V_{v-w}$ and $V_{w-u}$ can be similarly given. Those line voltages $V_{u-v}$, $V_{v-w}$ and $V_{w-u}$ have a phase difference of $2\pi/3$ among them and are equal in frequency to the control voltages $P_u$, $P_v$ and $P_w$ respectively. Also the line voltages have magnitudes varied in accordance with those of the control voltages.

From the foregoing it is seen that, an alternating current having a variable voltage and a variable frequency can be produced by changing the frequencies and amplitudes of the control voltages $P_u$, $P_v$ and $P_w$.

Figure 3:
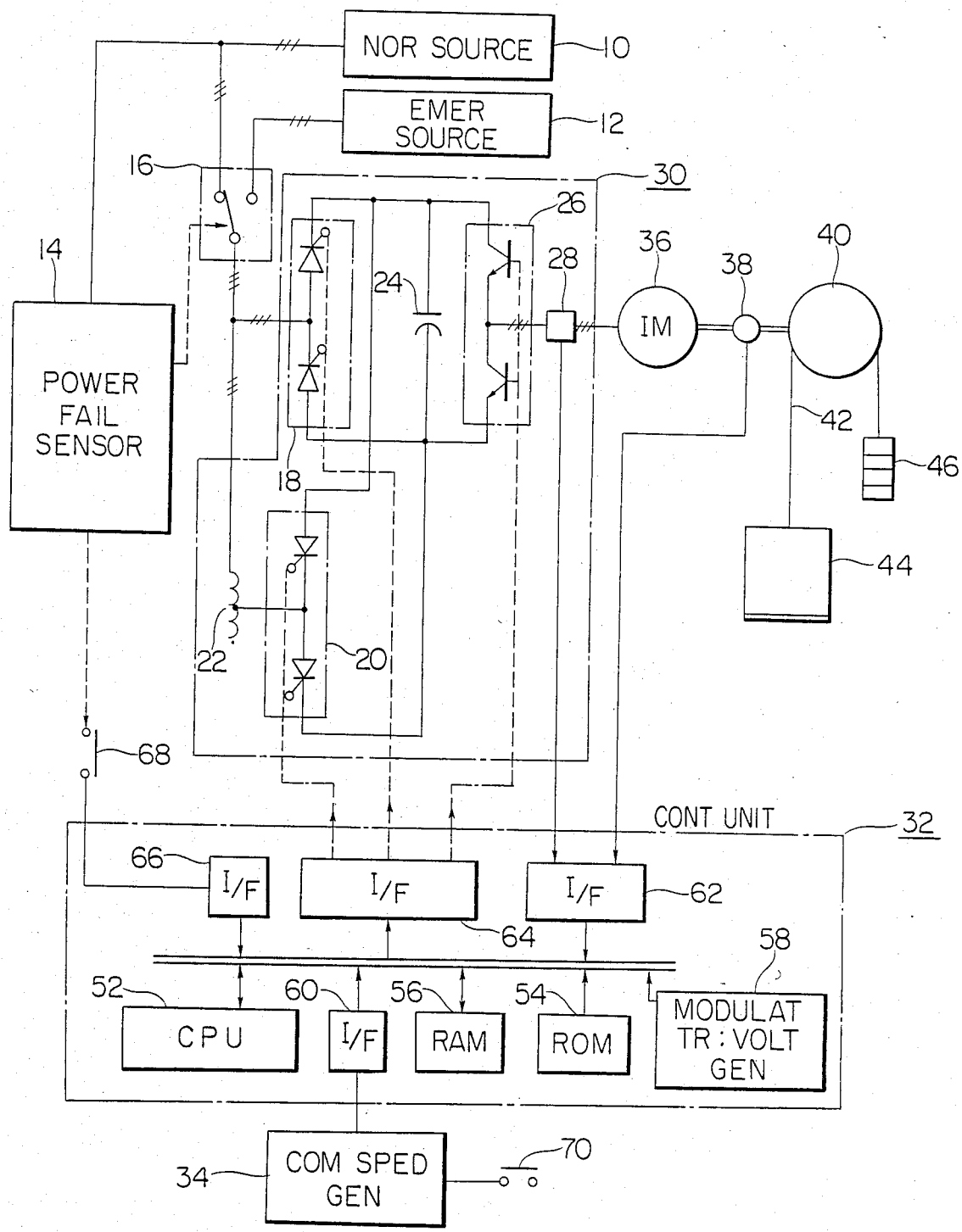
FIG. 3 is a block diagram of one embodiment of an elevator control system according to the present invention.

Referring now to FIG. 3, there is illustrated, in a single line diagram, one embodiment of the present invention. The illustrated arrangement comprises a normal power source 10 for generating a three-phase AC power at a constant voltage and an emergency power source 12 enabled upon the occurrence of a power failure on the normal source 10 to generate a three-phase AC power similar to that from the normal power source 10, a power failure sensor 14 connected to the normal source 10 to sense a power failure occurring on the latter and a change-over switch having a pair of stationary contacts connected to the normal and emergency sources 10 and 12 respectively with the sensor 14 operatively coupled to a movable arm of the change-over switch 16.

The change-over switch 16 is connected via the movable arm to a converter 18 including a plurality of thyristors to convert the three-phase AC power from the normal or emergency source 10 or 12, as the case may be, to a DC power at a variable voltage, and a regenerative converter 20 including a plurality of thyristors is connected in parallel circuit relationship to the converter 18 through an autotransformer 22 to convert the DC power therefrom to an AC power which is, in turn, supplied through the change-over switch 16 to the normal or emergency source 10 or 12, as the case may be, after an AC voltage from the regenerative converter 20 has been changed enough to be supplied to the source 10 or 12.

The arrangement comprises further a smoothing capacitor 24 connected across the DC output of the converter 18, and an inverter 26 connected across the capacitor 24 and therefore the output of the converter 18. The inverter 26 includes a plurality of transistors to invert the DC power from the converter 18 and smoothed by the smoothing capacitor 24 to an AC power having a variable voltage and a variable frequency. The transistor-inverter 26 is connected at the output to a voltage sensor 28 for sensing an AC voltage from the inverter 26.

The components 18, 20, 22, 24, 26 and 28 is described above form a variable voltage, variable frequency control generally designated by the reference numeral 30.

As shown in FIG. 3, a control unit generally designated by the reference numeral 32 applies control signals to the variable voltage, variable frequency control 30 to effect the PAM and PWM controls thereof in accordance with a command speed signal supplied by a command speed generator 34.

The components and their connections as described above form a conventional control system for an induction motor for driving an elevator car. The inverter 26 is connected to an induction motor 36 through the voltage sensor 28 connected to the control unit 32. The induction motor 36 is connected to a tachometer generator 38 for sensing the actual speed of the induction motor 36 and also to a hoist 40 with the tachometer generator 38 connected to the control unit 32. A hoisting rope 42 is trained over the hoist 40 and has an elevator car 44 and a counter weight 46 connected at both ends thereof.

It is assumed that the normal power source 10 is maintained alive and the change-over switch 14 connects the normal source 10 to the converter 18. Under the assumed condition, the issue of a command dispatch signal causes the command speed generator 34 to deliver a command speed signal to the control unit 32. The control unit 32 responds to the command speed signal to control the converter 18 and generate control voltages to control the transistorized inverter 26. This results in the generation of an AC voltages having a variable voltage and a variable frequency as described above. It is here assumed that the voltage and frequency delivered by the inverter 26 are preset to be variable so as to fullfill the relationship that frequency/voltage = constant   (1)

holds. Thus a variation in voltage results in a change in frequency.

The voltage sensor 28 senses this variable voltage and the sensed voltage is supplied to the control unit 32 where it is compared with the command speed signal from the command and speed generator 34. The results of the comparisons give a U phase control voltage $P_u$ and a V phase control voltage $P_v$ as shown in FIG. 2A and a W phase control voltage $P_w$ similar to the voltages $P_u$ and $P_v$ whereby the output voltage from the inverter 26 has a desired magnitude.

The variable voltage, variable frequency output from the inverter 26 is supplied to the induction motor 36 which, in turn, drives the elevator car 44 and the counter weight 46 through the hoist 40 and the hoisting rope 42. At that time, no magnetic saturation occurs on the induction motor 36. This is because the voltage and frequency delivered by the inverter 26 are varied so as to fulfill the relationship (1).

The actual speed of the induction motor 36 is sensed by the tachometer generator 38 and then supplied to the control unit 32 where it is compared with the command speed signal from the command speed generator 34. The control unit 32 responds to the result of the comparison to control the output from the inverter 26 thereby to control the induction motor 36 to a command speed.

Upon the occurrence of a power failure on the normal power source 10, the power failure sensor 14 senses this power failure to cause the change-over switch 16 to disconnect the conveter 18 from the normal power source 10 and connect the converter 18 to the emergency power source 12.

The process as described above is repeated with the converter 18 supplied with the three-phase AC power from the emergency power source 12.

Since the converter 18 consists of a plurality of thyristors and converts the AC power to the DC power, the same has a power factor $P_f$ on its AC side expressed by $$P_f = V_{dc}/\sqrt{2} \cdot V_{ac}$$  (2)

where $V_{ac}$ designates an AC voltage and $V_{dc}$ designates a DC voltage.

In the arrangement of FIG. 3, the AC voltage $V_{ac}$ is maintained constant while the DC voltage $V_{dc}$ is responsive to the speed of the associated elevator car to be variable as shown in FIG. 1B. At that time, the transistor-inverter 26 continues to be operated during the time intervals ($T_L$-$T_1$) (see FIG. 1A) and the AC power supplied to the converter 18 has a power factor $P_f$ expressed by the expression (2). Accordingly, the power factor $P_f$ becomes low during the time interval ($T_2$-$T_1$) for which the elevator car is accelerated and during the time interval ($T_4$-$T_3$) for which the elevator car is decelerated. The normal power source 10 has generally a high capacity and does not depend upon the power factor of an AC power delivered thereby but the emergency power source 12 is relatively small in capacity. Thus, with a low power factor thereof, the emergency power source is required to be large in capacity. This has resulted in the disadvantage that the emergency source becomes expensive.

The present invention contemplates to eliminate the disadvantage of the prior art practice as described above by the provision of a control unit for controlling a converter for converting an AC power to a DC power so that a DC voltage from the converter due to the emergency power source is higher than that due to the normal power source.

According to the present invention, the control unit 32 includes a central processing unit (which is abbreviated hereinafter to a "CPU") 52 connected in two ways to a bus 50, a read only memory (which is abbreviated hereinafter to an "ROM") 54 having stored therein a table listing a program for operating the arrangement of FIG. 3, amplitudes and frequencies of the control voltage at associated addresses and connected to the bus 50, a random access memory (which is abbreviated hereinafter to an "RAM") 56 having temporarily stored therein data and the results of calculations and connected in two ways to the bus 50, a modulating triangular voltage generator 58 connected to the bus 50, and various interfaces connected to the bus 50. The interface 60 receives the command speed signal from the command speed generator 34, the interface 62 receives the signals from the voltage sensor 28 and the tachometer generator 38, the interface 64 supplies control signals to the converter 18, the regenerative converter 20 and the transistorized inverter 26 respectively and the interface 66 receives a signal from the power failure sensor 14 through a power failure sensing contact set 68 which is normally open and closed when the power failure sensor 14 senses a power failure occurring on the normal source 10.

The command speed generator 34 is connected to a command operating means 70 in the form of a normally open contact set 70 which is closed when the elevator car is operated.

As described above, the arrangement of FIG. 3 is illustrated in a single line diagram and therefore the symbol "three tilted lines" crossing the connecting lead designates that the arrangement is of a three phase AC system. While each of the converters 18 and 20 and the inverter 26 is illustrated as including a single pair of serially connected semiconductor elements such as thyristors or transistors it is to be understood that each of them actually includes a parallel combination of three pairs of such semiconductor elements one pair for each phase of the system.

Figure 4A:
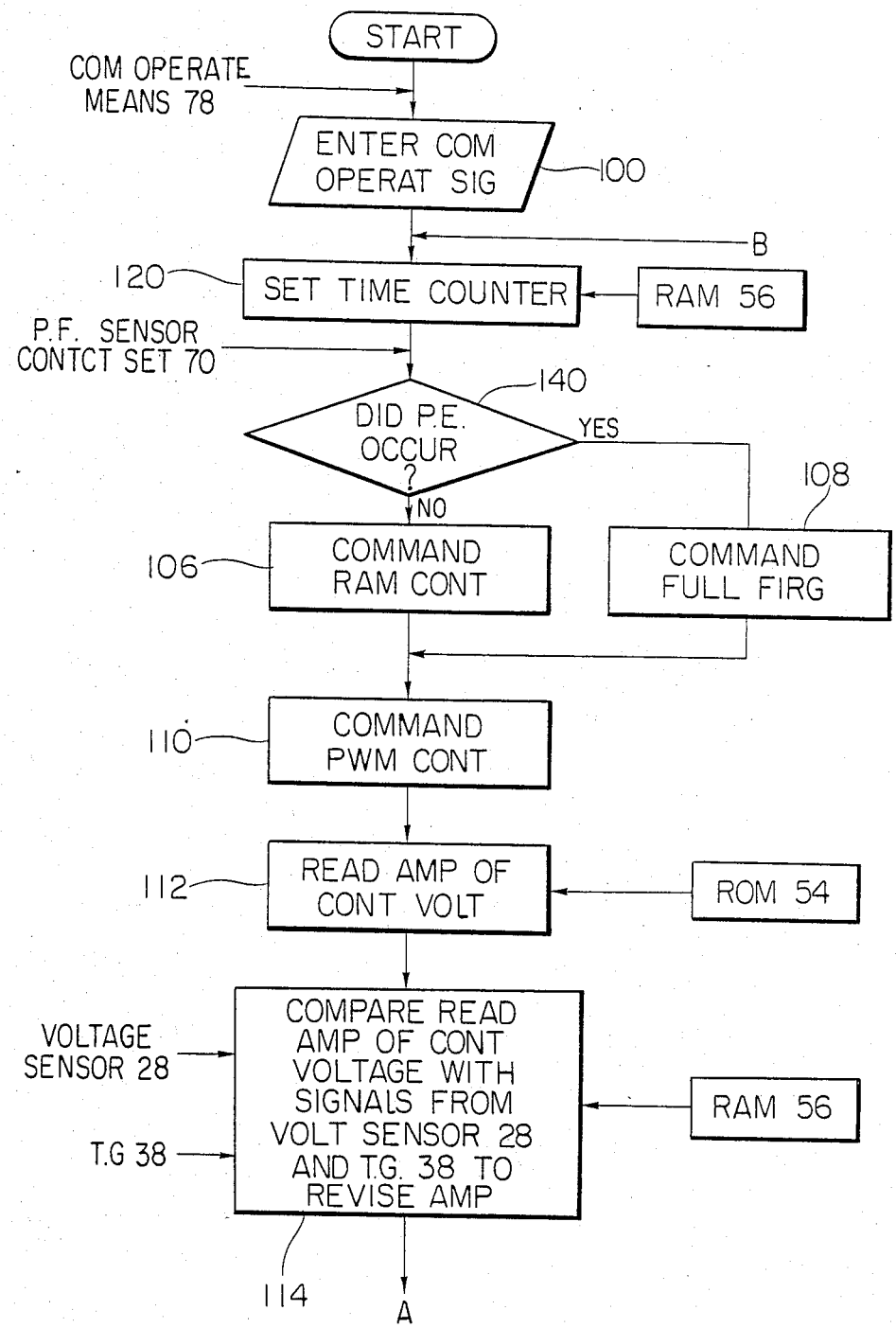
FIGS. 4A and 4B are combined together to illustrate a flow chart for programming the operation of the arrangement shown in FIG. 3.
Figure 4B:
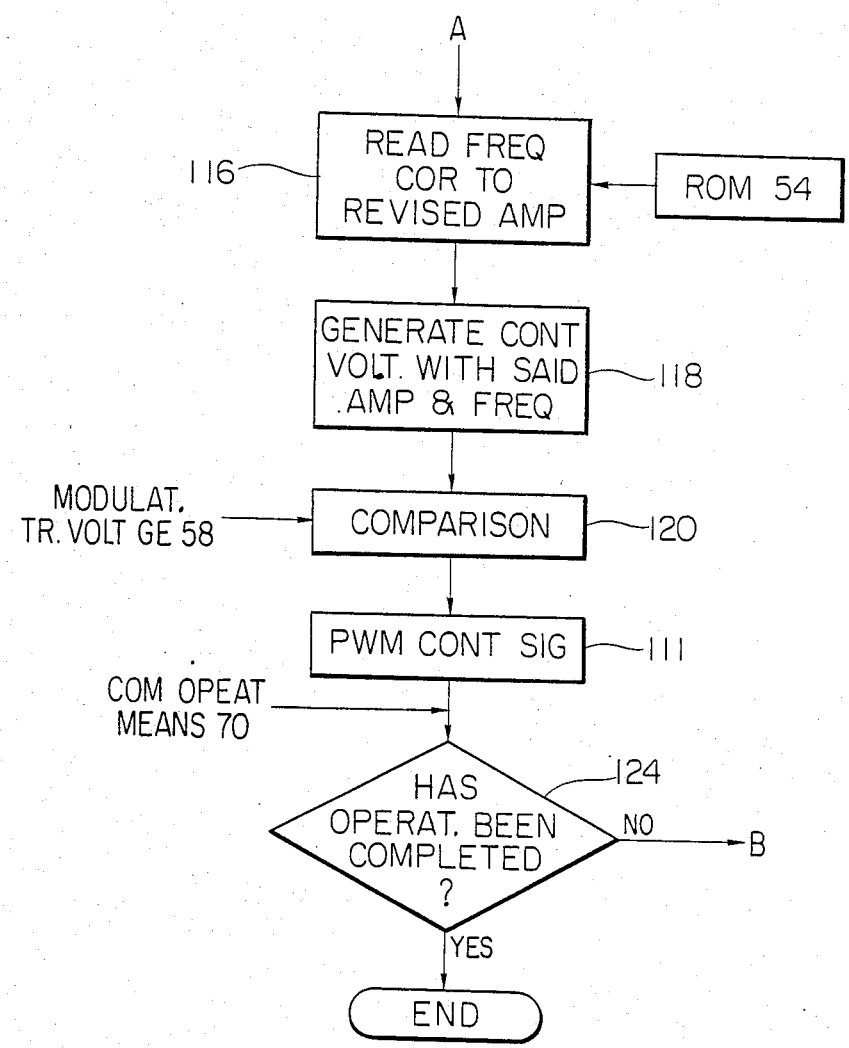

The operation of the arrangement shown in FIG. 3 will now be described in conjunction with FIGS. 4A and 4B which are combined together to show a program for operating the arrangement shown in FIG. 3. When the command operating means 70 is put in its closed position to issue a command operation, the command speed generator 34 delivers a command speed signal to the control unit 32 through the interface 60 at the step 100 following the step labelled "START" as shown in FIG. 4. Then the step 102 is entered to set a time counter (not shown) which is stored in the RAM 56. The next succeeding step 164 is to determine if a power failure has occurred on the normal source 100 by entering a signal from the power failure sensing contact set 68 through the interface 66. When the power failure has not occurred as determined in the step 104, the step 106 is entered where the PAM control is commanded to control the firing angle of the converter 18 or 20. When the step 104 givesn an answer "YES", the step 108 commands so as to fully fire the converter 18 or 20. Following the step 106 or 108, the step 110 commands the PWM control and then the step 112 is entered. The step 112 is to read from the ROM 54 that amplitude of a control voltage stored at its address corresponding to the time counter therein. The ROM 54 includes addresses $m_0$, $m_1$, $m_2$, $m_3$, . . . and corresponding amplitudes $A_0$, $A_1$, $A_2$, $A_3$, . . . stored therein. Thereafter the step 114 is entered where the read amplitude of the control voltage is compared with signals from the voltage sensor 28 and the tachometer generator 38 to revise the amplitude. The revised amplitude is stored in the RAM 56. As shown by the reference character A in FIGS. 4A and 4B, the step 114 goes to the step 116 where there is read out a frequency corresponding to the revised amplitude from the ROM 54 which includes addresses $n_0$, $n_1$, $n_2$, $n_3$, . . . and corresponding frequencies $f_0$, $f_1$, $f_2$, $f_3$, . . . stored therein. Then the step 118 is entered to generate control voltages having the amplitudes and frequencies read out from the ROM 54 at the steps 112 and 1116 respectively. As shown in FIG. 2A, those control voltages are compared with the modulating triangular voltage $P_t$ from the modulating triangular voltage generator 58 at the step 120. The next succeeding step 122 responds to the results of the comparisons effected in the step 120 to deliver PWM control signal to the inverter 26 to effect the ON-OFF control thereof. Then the step 124 determines if the operation has been completed by using the signal from the command operating means 70. When the operation continues as determined in the step 124, the program is returned back to the step 102 as shown by the reference character B in FIGS. 4B and 4A, and the process as described above is repeated after the time counter has been newly set.

On the other hand, when the operation has been completed as determined in the step 124, the latter goes to the step labelled "END" resulting in the end of the program.

From the foregoing it is seen that, in the operation by the normal power source 10, the PAM control is effected along with the PWM control and in the operation by the emergency power source 12, the PWM control is effected with the full voltage delivered by the converter. Therefore noise due to the induction motor can decrease in the operation by the normal operation while a high power factor can be provided in the operation by the emergency power source. Thus the emergency source can be inexpensive by decreasing the capacity thereof.

In the operation by the emergency power source, the output voltage from the converter increases resulting in a fear that the induction motor will cause noise. However, the emergency power source is only rarely used and in special conditions called a power failure. Accordingly, the occurrence of such noise is out of the question.

While the present invention has been illustrated and described in conjunction with a single preferred embodiment thereof it is to be understood that numerous changes and modifications may be resorted to without departing from the spirit and scope of the present invention. For example, while the present invention has been described in conjunction with what generates a DC power by the converter fully fired in the operation by the emergency power source it is to be understood that the present invention is not restricted thereto or thereby and that it is required only to render the DC power due to the emergency power source higher than that due to the normal source.

What is claimed is:

1. An elevator control system comprising a normal power source for generating an AC power at a constant voltage, a converter for converting the AC power from said normal power source to a DC power having a variable voltage, an inverter for inverting said DC power with said variable voltage to an AC power having a variable voltage and a variable frequency, and an induction motor for an elevator car driven and controlled by said inverter wherein there are provided power failure sensor for sensing the occurrence of a power failure on said normal power source and generating a power failure indicating signal; an emergency power source for generating an AC power during a power failure occurring on said normal power source; a change-over switch disposed between said normal and emergency power sources and said converter to change the connection of said converter so that a power supply to said converter is effected by either one of said normal and emergency power source, said change-over switch performing the change-over operation in response to the power failure indicating signal from said power failure sensor so that, when the normal power source is normally operated, said normal power source supplies an electric power to said converter and that, when a powers failure occurs on said normal power source, the emergency power source supplies an electric power to said converter; and a control unit for applying a control signal to said converter to deliver said DC power having said variable voltage, said control unit being responsive to said power failure indicating signal from said power failure sensor to supply a signal to said converter so as to cause said converter to generate a DC voltage higher than that generated by said converter when the latter receives the power supply from said normal power source.

2. An elevator control system as claimed in claim 1 wherein said converter is formed of a plurality of semiconductor switching elements, and said control unit delivers signals to said semiconductor switching elements to effect the conduction control thereof whereby the voltage of the DC output from said converter is controlled.

3. An elevator control system as claimed in claim 2 wherein each of said semiconductor switching elements is a thyristor and said signals delivered by said control unit control firing angles thereof.

4. An elevator control system as claimed in claim 1 wherein said control unit is responsive to the normal operation performed by said normal power source as determined by said power failure sensor senses to control a voltage of the DC power from said converted to be variable and responsive to the occurrence of a power failure on said normal power source as determined by said power failure sensor to control said converter to be fully fired.

5. An elevator control system as claimed in claim 1 wherein said control unit includes a memory having stored therein an amplitude of the output from said inverter corresponding to a command speed signal for said induction motor and further a frequency of the output from said inverter corresponding to said amplitude.

6. An elevator control system as claimed in claim 5 wherein said control unit delivers also a control signal to said inverter so as to control a pulse width of the output voltage from said inverter with the peak value thereof fixed.

7. An elevator control system as claimed in claim 6 wherein said control unit is responsive to both a signal from a voltage sensor for sensing the output voltage from said inverter and a signal from a tachometer generator for sensing the speed of said induction motor, to revise the amplitude of the output voltage from said inverter.

8. An elevator control system as claimed in claim 7 wherein said control unit reads out a frequency corresponding to said revised ampllitude from said memory, and said control unit supplies to said inverter signals corresponding to said revised amplitude and to said read-out frequency.

9. An elevator control system as claimed in claim 1 wherein said power failure sensor is connected to said normal power source and senses whether or not a power failure occurs on said normal power source.

10. An elevator control system as claimed in claim 1 wherein there is provided a regenerative converter formed of a plurality of thyristors to convert a regenerative power from said induction motor to an alternating current which is, in turn, returned back to the power source, said regenerative converter being connected in parallel circuit relationship to said converter, and said control unit controls said regenerative converter to be fully fired.

11. An elevator control system as claimed in claim 10 wherein said control unit controls the output voltage from said regenerative converter to be variable, when said normal power source is normally operated.

12. An elevator control system as claimed in claim 1 wherein said inverter comprised a transistor-inverter formed of a plurality of pairs of serially connected transistors connected in parallel circuit relationship to one another, the number of said pairs being equal to the number of phases of said normal power source.

* * * * *